April 10, 1956 J. P. SHIELDS 2,741,722

TELEVISION PATTERN GENERATOR

Filed Oct. 30, 1952

INVENTOR.
John P. Shields

BY
Webb Mackey + Burden
HIS ATTORNEYS

United States Patent Office 2,741,722

Patented Apr. 10, 1956

2,741,722

TELEVISION PATTERN GENERATOR

John P. Shields, Edgeworth, Pa.

Application October 30, 1952, Serial No. 317,677

4 Claims. (Cl. 315—22)

This application relates to a television pattern generator. More particularly, it relates to apparatus which will produce on a television receiver a fixed pattern which can be used by persons testing or repairing the receiver.

There is now available apparatus which will project a fixed pattern on a television receiver. Such apparatus as is now available, however, has several serious drawbacks. In the first place, the apparatus is both heavy and delicate, which means that a television repairman cannot take it with him when he repairs television sets where they are installed, as in homes, clubs, etc. Also, the pattern generators now available do not provide any circuit whereby the audio portion of a television receiver can be tested. The television pattern generator which I have invented is compact and rugged in construction and weighs a fraction of the generators now available. It can produce horizontal and vertical lines on a television receiver screen at the same time and it contains a circuit whereby the audio section of the receiver can be tested. Of considerable importance, the cost of my generator is a fraction of the cost of the generators now on the market.

In the accompanying drawings, I have illustrated a present preferred embodiment of my invention in which—

Figure 1:
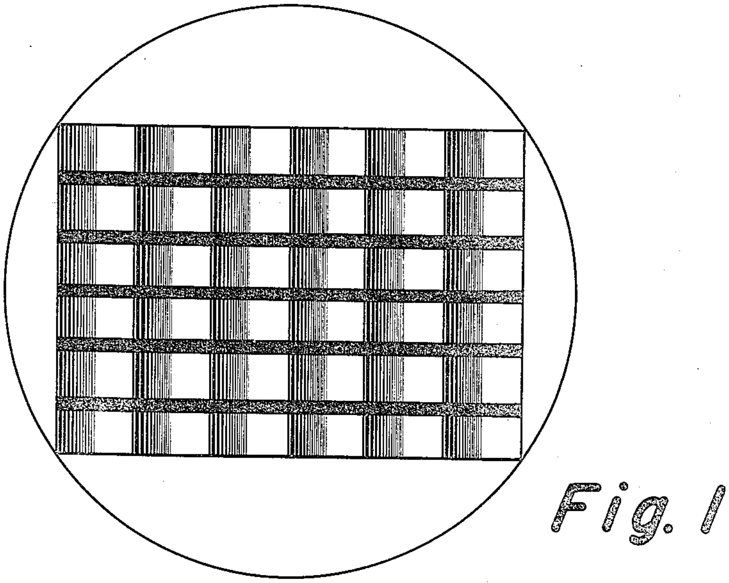
Figure 2:
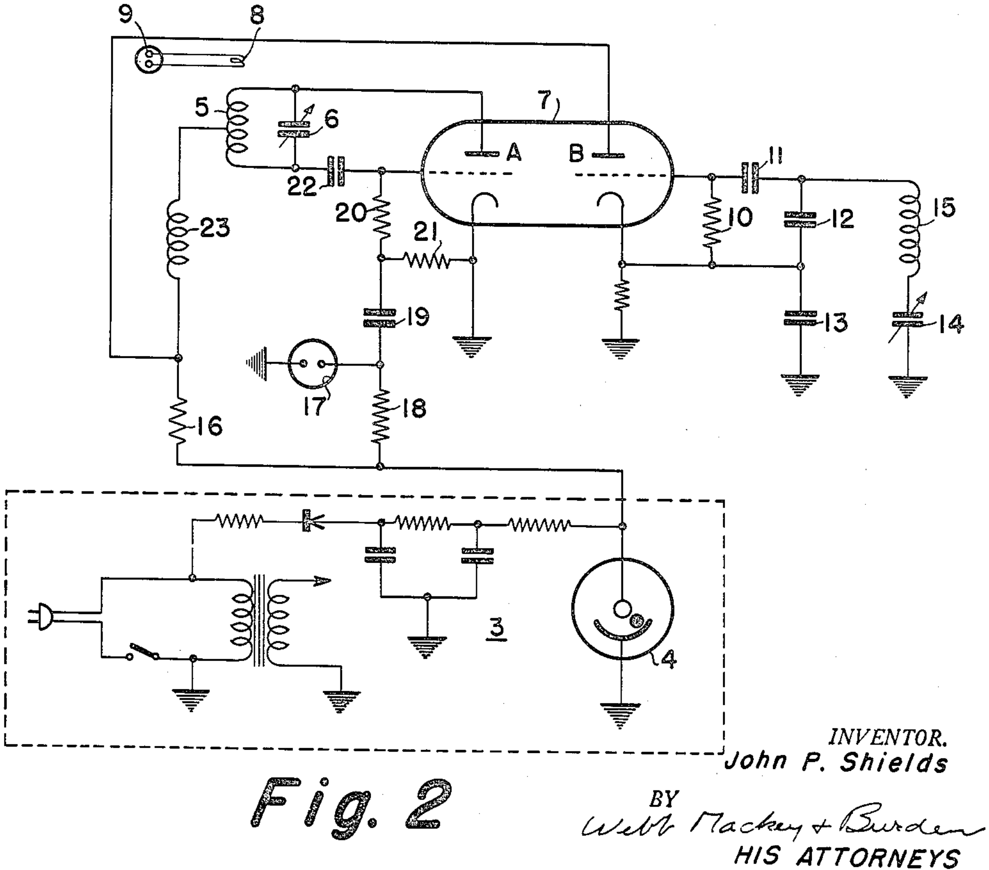

Figure 1 is a pictorial representation of the pattern produced by my television generator; and Figure 2 is a diagram showing the circuitry of my pattern generator.

Figure 1 is a representation of a pattern produced on a television receiver screen by my generator. The pattern is characterized by solid black horizontal lines with sharp edges which will enable a television repairman to quickly and easily rate the performance of the television receiver which he is repairing or testing. The pattern also has vertical lines which have a black sharply defined left-hand edge (viewing the receiver) and which are shaded out towards the right. The shading will enable him to determine the "gain" of the receiver, i. e., the ability of the receiver to show contrast on the screen.

Figure 2 of the drawings shows the circuitry of my pattern generator. The portion of the circuit which is within the dash lines, and which is designated generally by the reference number 3, is a conventional circuit for supplying a steady B+ voltage for operating the device. The power circuit includes a gas voltage regulator tube 4.

My generator includes three circuits. One is a circuit for generating a carrier wave, which carrier wave is generated at the same frequency as is used by one of the broadcasting stations which can be received by the set being tested. This carrier wave is fed to the television receiver being tested in a manner hereinafter explained. The generator also includes two additional oscillatory circuits which modulate the carrier wave to produce vertical and horizontal bars on the screen of the set being tested, and to produce an audible sound useful for testing the audio portion of the receiver.

An inductance 5, a variable condenser 6 and a triode

A in a double triode tube 7 form the oscillator circuit which generates the carrier wave. Oscillations in the inductance 5 induce oscillations in an inductance 8 which is connected to the antenna input of the television receiver being tested through the terminals 9. As noted above, the carrier wave is tuned to the frequency of one of the broadcasting stations which can be received by the set being tested.

The vertical bars can be produced by any conventional high frequency oscillator circuit, but I prefer to use the "Colpits" oscillator circuit because it is very stable. Referring to Figure 2, the resistance 10, condensers 11, 12, 13 and 14, inductance 15 and a triode B in the double triode tube 7 form the Colpits oscillating circuit which I prefer to use. This oscillatory circuit is tuned to produce a frequency which is a multiple of the frequency of the horizontal sweep oscillator circuit in the receiver being tested.

The Colpits oscillating circuit modulates the carrier wave generated by the inductance 5 and condenser 6 in the following manner. Oscillations in the plate current in the triode B produce a varying voltage drop across a resistance 16 which is connected in series with the plate current and the B+ voltage source 3. The varying voltage drop across the resistance 16 varies the plate voltage between the plate and cathode in the triode A. Varying the voltage between the plate and the cathode in triode A, of course, varies the plate current in this triode. Variations in the plate current in triode A varies the amplitude or strength of the oscillations in the carrier wave circuit generated by inductance 5 and condenser 6. The variations in amplitude or strength are, of course, induced in the inductance 8 to which the antenna input of the television receiver being tested is connected.

As above noted, I use a Colpits oscillatory circuit to produce the vertical bars in the television receiver. I prefer such circuit because it can operate at 80 to 90 kilocycles and, therefore, can be tuned to a multiple of the frequency of the horizontal sweep oscillator circuit in the television receiver. Also, the oscillations developed by this oscillator are in the form of a smooth sine curve which will produce shading in the vertical bars. As above noted, this shading enables an operator to determine the "gain" of the receiver being tested.

The circuit for producing the horizontal bars includes a gas discharge tube 17 which is connected to the B+ voltage source 3 through a resistance 18. The circuit also includes a condenser 19. When voltage is applied, the condenser 19 will start to charge through the resistance 18. When the charge across the condenser 19 reaches the ionization potential of the gas tube 17, the tube will "fire" and discharge the condenser. This cycle will be repeated as long as a voltage is applied. The condenser 19 is connected to two resistances 20 and 21 which are also connected into the grid circuit of the triode A. The resistances 20 and 21 form a grid leak for the triode A. The resistance 20 also isolates the condenser 19.

Voltage created by the charge and discharge of the condenser 19 is impressed across the resistances 20 and 21. Variations in the voltage which are impressed on these resistances modulate the carrier wave oscillator circuit in both frequency and amplitude. Variations in voltage impressed on the grid of triode A vary the plate current in the triode at a frequency determined by the frequency of the variations in voltage created by the gas tube 17, which in turn is dependent on the value of the resistance 18. The value given to this resistance 18 will also determine the number of horizontal lines produced, since this number depends upon the ratio of the frequency produced by the gas tube oscillator to that of the frequency of the vertical oscillator in the television receiver under test. The resistance 18 should have such value that the gas tube oscillator circuit has a frequency which is an even multiple of the vertical sweep oscillator of the television receiver.

It will be noted that in the above circuit, the condenser 19 performs several functions in the horizontal bar generating circuit. First, it transfers the oscillating voltage across the gas tube 17 to the junction of the resistances 20 and 21. Second, it prevents positive voltage on the gas tube 17 from being impressed on the grid of the triode A. Third, it adds to and subtracts from the biasing voltage to the grid of the triode A. Finally, it shapes the wave form of the voltage applied by the gas tube oscillating circuit to the grid in triode A. The condenser charges fast and discharges through resistance 21. This gives a pulse-shaped wave form to the voltage applied to the grid in triode A which, of course, produces pulse-shaped variations in the plate current in this triode which modulates the carrier wave.

The gas discharge tube oscillator circuit, because it produces a sharp pulse wave form, also modulates the carrier wave produced in the television receiver to produce a good distinguishable sound which can be used to test the audio section of the television receiver.

A condenser 22 in the carrier wave oscillator circuit prevents B+ voltage from reaching the grid in triode A. An inductance 23 is connected between the inductance 5 of the carrier wave oscillator circuit and the resistance 16 to prevent any signal from the carrier wave oscillator from developing across resistance 16.

As above noted, the television pattern generator which I have invented will produce simultaneously both horizontal and vertical bars on the screen of a television set being tested. The circuit will also produce an audible sound which can be used to test the audio section of the receiver. The vertical bars generated are shaded across the screen so that the ability of the set to pick up contrast can be determined by the operator. My pattern generator is compact, comprises relatively few parts and is, therefore, light in weight and can be sturdily constructed. It can be readily carried from place to place and, of considerable importance, it can be manufactured at a cost considerably lower than pattern generators now available on the market.

While I have described a present preferred embodiment of my invention, it is to be understod that it may be otherwise embodied within the scope of the appended claims.

I claim:

1. A television pattern generator comprising a carrier wave oscillator, means for coupling the oscillator to the antenna input of a television receiver, a high frequency oscillator adapted to operate at multiples of the frequency of the horizontal sweep oscillator in said receiver, a source of operating voltage, a resistance in series with said voltage source and with said carrier wave oscillator and said high frequency oscillator, the two oscillators being in parallel with each other, and a gas tube oscillator adapted to be tuned to a frequency which is an even multiple of the vertical sweep oscillator of said receiver and connected to the carrier wave oscillator.

2. A television pattern generator comprising a carrier wave oscillator, means for coupling the oscillator to the antenna input of a television receiver, a high frequency oscillator adapted to operate at multiples of the frequency of the horizontal sweep oscillator in said receiver, a source of operating voltage, a resistance, and circuits whereby both the carrier wave oscillator and the high frequency oscillator are supplied by said voltage source through said resistance, and a gas tube oscillator adapted to be tuned to a frequency which is an even multiple of the vertical sweep oscillator of said receiver and connected to the carrier wave oscillator.

3. In a television pattern generator having a carrier wave oscillator and means for coupling the oscillator to the antenna input of the receiver, a circuit for modulating the carrier wave current to produce a series of vertical bars on the screen of the receiver comprising a high frequency oscillator adapted to operate at multiples of the frequency of the horizontal sweep oscillator in the receiver, a source of operating voltages for the carrier wave and said high frequency oscillator, a resistance and means for supplying voltage from the said voltage source through said resistance to each of the carrier wave and high frequency oscillators.

4. In a television pattern generator having a carrier wave oscillator and means for coupling the oscillator to the antenna input of the receiver, a circuit for modulating the carrier wave current to produce a series of horizontal bars on the screen of the receiver comprising a gas tube oscillator adapted to operate at frequencies which are even multiples of the frequency of the vertical sweep oscillator in the receiver, and means for connecting the gas tube oscillator into the grid circuit of the carrier wave oscillator.

References Cited in the file of this patent

UNITED STATES PATENTS

| | | |
|---|---|---|
| 2,292,045 | Burnett | Aug. 4, 1942 |
| 2,559,388 | Baldridge | July 3, 1951 |
| 2,580,083 | Doba | Dec. 25, 1951 |
| 2,627,025 | Trembly | Jan. 27, 1953 |
| 2,668,188 | Naslund | Feb. 2, 1954 |
| 2,693,530 | Macdonald | Nov. 2, 1954 |